United States Patent [19]

Brearley

[11] Patent Number: 5,023,780

[45] Date of Patent: Jun. 11, 1991

[54] METHOD OF OPERATING A PACKET SWITCHING NETWORK

[75] Inventor: John R. Brearley, Nepean, Canada

[73] Assignee: Northern Telecom Limited, Montreal, Canada

[21] Appl. No.: 635,382

[22] Filed: Jan. 3, 1991

[51] Int. Cl.⁵ .................... G06F 15/16; H04Q 1/00; H04L 5/00

[52] U.S. Cl. .................. 364/200; 364/228.4; 364/229; 364/238; 364/238.3; 364/240.5; 364/240.7; 364/241.8; 364/242.94; 370/60; 370/94.1; 370/94.2

[58] Field of Search ............. 364/200, 900; 370/60, 370/94.1, 94.2

[56] References Cited

U.S. PATENT DOCUMENTS

| | | | |
|---|---|---|---|
| 4,058,672 | 11/1977 | Crager et al. | 370/94 |
| 4,493,021 | 1/1985 | Agrawal et al. | 364/200 |
| 4,677,588 | 6/1987 | Benjamin et al. | 364/900 |
| 4,692,917 | 9/1987 | Fujioka | 370/60 |
| 4,855,995 | 8/1989 | Hiyama et al. | 370/94.1 |
| 4,876,681 | 10/1989 | Hagiwara et al. | 370/94.1 |
| 4,893,307 | 1/1990 | McKay et al. | 370/94.1 |
| 4,897,874 | 1/1990 | Lidinsky | 370/60 |
| 4,899,333 | 2/1990 | Roediger | 370/94.1 |
| 4,922,486 | 5/1990 | Lidinsky et al. | 370/94.1 |
| 4,930,122 | 5/1990 | Takahashi et al. | 370/94.1 |
| 4,956,808 | 9/1990 | Aakre et al. | 364/900 |

Primary Examiner—Joseph A. Popek
Assistant Examiner—George C. Pappas
Attorney, Agent, or Firm—Dallas F. Smith

[57] ABSTRACT

A method of operating a packet switching network is disclosed in which a Systems Network Architecture (SNA) computer can control a remote terminal cluster controller and terminals coupled thereto via a switched virtual circuit connection to the terminal cluster controller. The terminals coupled to the terminal cluster controller are able to establish switched virtual circuit connections to other compatible computers, independent of the computer by which the terminal cluster controller is controlled. This is achieved by an access module of the network, to which the terminal cluster controller is connected, presenting different representations of the terminal configuration to the different computers.

5 Claims, 1 Drawing Sheet

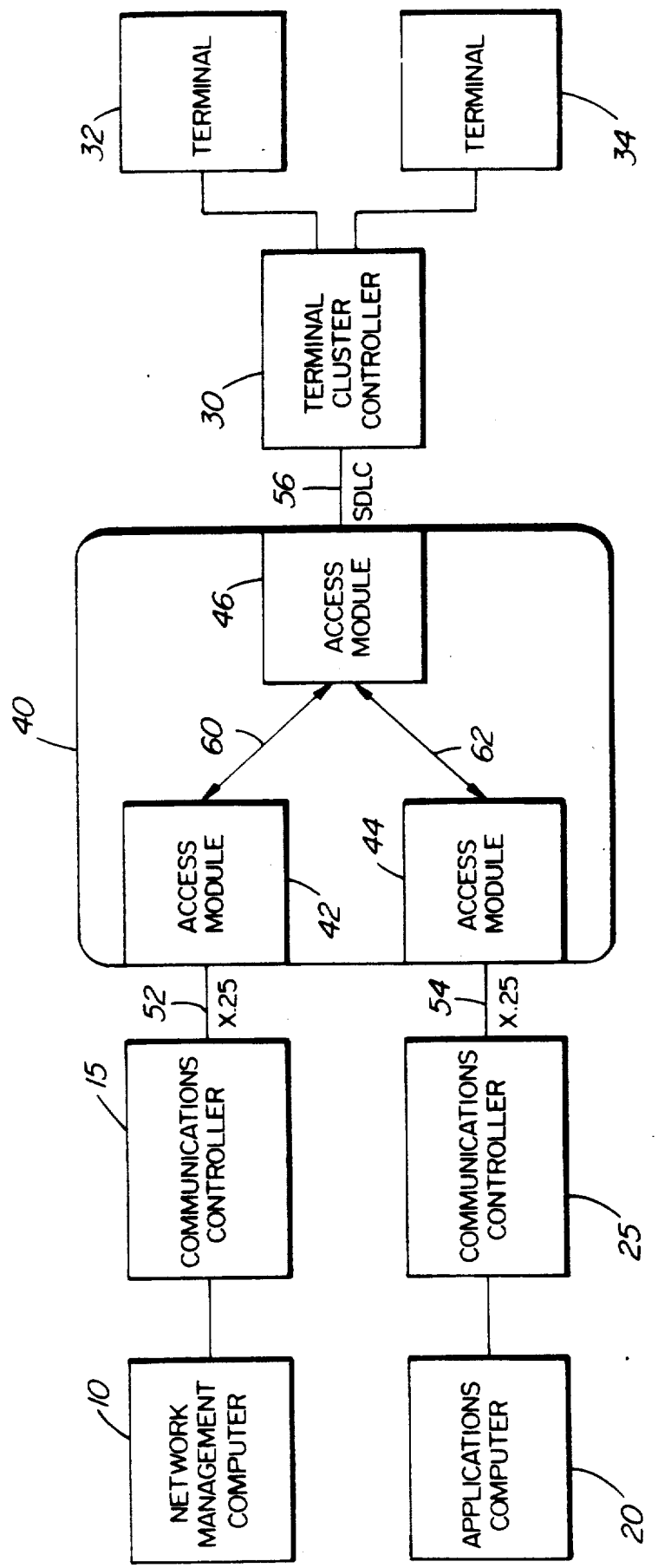

METHOD OF OPERATING A PACKET SWITCHING NETWORK

This is a continuation of application Ser. No. 211,649 filed June 28, 1988, now abandoned.

This invention relates to a method of operating a packet switching network, and is particularly concerned with such operation that allows a computer to control a terminal cluster via the packet switching network.

BACKGROUND OF THE INVENTION

Within data communications, two major standards dominate. One is CCITT X.25, the international standard for data communication by way of a public data packet network. The other is Systems Network Architecture (SNA), IBM's protocol, which has become a de facto standard, at least in North America, by virtue of widespread use.

Supporting communications between SNA computers and SNA terminals on a packet switching network has passed through several phases, each of which has compromised either the SNA functions, the packet switching functions or both. Early implementations required each terminal cluster controller, and hence all of the terminals connected thereto, to be connected to a single computer. Thus, the switching capability of the packet network was not used beyond merely establishing the virtual circuit to a predetermined computer. A later implementation allowed terminals to establish communications with any one of a number of computers available from the packet network; however, as these terminals no longer belonged to any one computer important SNA management services were not supported.

SUMMARY OF THE INVENTION

An object of this invention is to provide an improved method of operating a packet switching network.

In accordance with the present invention there is provided a method of operating a packet switching network comprising at least a first network access module having a plurality of terminals coupled thereto via a terminal cluster controller and at least two second network access modules each having a respective computer coupled thereto, the method comprising the steps of: storing in the first network access module information relating to a configuration of the terminal cluster controller and said plurality of terminals; establishing a first switched virtual circuit connection between the first network access module and one of the second network access modules having a first computer coupled thereto, wherein the first network access module provides a representation of said configuration of the terminal cluster controller and said plurality of terminals from the stored information to the first computer via this first switched virtual circuit connection for control of the terminal cluster controller and said plurality of terminals by said first computer; establishing a second switched virtual circuit connection between the first network access module and one of the second network access modules having a second computer coupled thereto, wherein the first network access module provides a representation of a single one of said plurality of terminals coupled thereto via the terminal cluster controller to the second computer via this second switched virtual circuit connection and translating addresses in the first network access module for communications via the second switched virtual circuit connection between the second computer and said single one of said plurality of terminals.

The present invention provides a method of controlling remote terminal clusters through the packet network. This method allows support of the SNA network management functions while terminals within these clusters are able to establish communication links with any compatible computer, including the SNA controlling computer available from the packet network. The invention allows the establishment of the terminal communication sessions independent of the computer controlling the terminal cluster.

BRIEF DESCRIPTION OF THE DRAWING

This invention will be further understood from the following description with reference to the accompanying drawing, in which: the figure illustrates, as a block diagram, a data communications system.

DETAILED DESCRIPTION

To facilitate the following system description a brief discussion of the System Network Architecture (SNA) network components follows. SNA provides several types of network components or nodes which are arranged in a hierarchical manner to provide a hardware basis for data communications. For the system under discussion, three node types are of interest. At the highest level is the type 5 node, the processor or computer, that controls SNA network resources, supports application and transaction programs, provides SNA network access to SNA network operators, and supports end user services. The next lower level is the type 4 node, the communications controller, that routes and controls the flow of data through the SNA network. At the lowest level is the type 2.0 peripheral node and the type 2.1 peripheral node, also known as a terminal cluster controller, that provides end-user access and services. The type 2.0 peripheral node supports session types 1, 2, and 3 for SNA. Type 2.1 terminal supports session type 6.2.

In the simplest form, the SNA network consists of a computer connected to a communications controller which is connected to a terminal cluster controller having several connected terminals. End users, who use the terminals, communicate with the computer by way of the two intermediate nodes, namely the terminal cluster controller and the communications controller.

Packet switching networks are typically implemented on two types of devices which may be separate or integrated. These are packet switching nodes and packet network access interface modules. For this description the makeup of the packet network does not matter as each access module acts as an end point of the virtual circuit through the packet network.

When interconnecting SNA nodes by way of a packet switching network, the link between the communications controller (type 4 node) and the terminal cluster controller (type 2.0 peripheral node) is established as a switched virtual circuit. This switched virtual circuit takes the place of a dedicated link such as a leased telecommunications line.

As stated earlier; the use of a packet network to replace dedicated links has required compromising some of the strengths of the two separate systems. Clearly the ability of terminals to both independently establish sessions with various computers and to be managed as provided by SNA is desirable.

Referring to the figure, there is illustrated a simplified data communications network having computers 10 and 20, a terminal cluster controller 30, and a packet switching data network 40. The packet network 40 includes access modules 42, 44, and 46. The computers 10 and 20 are connected to the access modules 42 and 44 respectively via communications controllers 15 and 25 respectively using X.25 communication links 52 and 54 respectively. The terminal cluster controller 30 is connected to the access module 46 via an SDLC link 56. Switched virtual circuits 60 and 62 complete communication links between the access module 46 and each of the access modules 42 and 44. The terminal cluster controller 30 has terminals 32 and 34 connected to it.

In operation, on activation of a service provided in access module 46 for supporting SNA terminal clusters, a switched virtual circuit, e.g. 60, is established between the terminal cluster controller 30 and a predetermined computer, e.g. 10, which is to own and control the terminal cluster controller 30. Once established, the virtual circuit remains until the service is deactivated. The virtual circuit provides computer 10 with a representation of the real cluster controller 30 and its terminals 32 and 34. Network management information can be sent to or requested from the terminals 32 and 34, without each of them having an individual virtual circuit connection to computer 10.

The terminals 32 and 34 may access any SNA computer connected to the packet network 40, for example as represented by the computers 10 and 20, for running application programs. To do so, a terminal, for example the terminal 32, calls the computer 20, causing the establishment of the virtual circuit 62. The virtual circuit 62 presents to the computer 20 a representation of a virtual terminal cluster, the representation showing a terminal cluster having a single terminal attached. By having a virtual circuit 60 from the terminal cluster controller 30 to the network management computer 10 while terminals attached to the terminal cluster controller 30 establish and release virtual circuits to application computers, for example virtual circuit 62 connecting the terminal 32 to the application computer 20, SNA network management functions are preserved while taking advantage of the packet switching network to route calls from terminals to application computers. In this case, the representation of the terminal cluster controller seen by the computer 10 differs from that seen by the computer 20, as discussed above.

Establishing the virtual circuit 60 supports communications between the computer 10 selected as the network management computer and the terminal cluster controller 30, which allows the terminal cluster controller and the terminals coupled thereto to be monitored and controlled by the computer 10. The conditions allowing the virtual circuit 60 to be established will now be described in further detail.

If several terminal cluster controllers (only one is shown in the figure for simplicity) are connected to the access module 46, each could have a different computer designated as the network management computer. Thus there can be several network management computers in the network, but each terminal cluster controller is assigned to only one of them.

Because the virtual circuit 60 presents a representation of the real terminal cluster to the network management computer 10, the access module 46 must store terminal cluster configuration data and address translation information to allow network management information from the network management computer to be routed correctly to terminals 32 and 34. The representation of the cluster presented by the access module 46 to the network management computer 10 is one of the terminals 32 and 34 attached to the terminal cluster controller 30 being inhibited from accepting new communications sessions. This condition prevents the network management computer 10 from trying to establish a communications session with a terminal which is already involved in a communications session with another computer, e.g. 20. However, the apparent inhibited status of the terminals does not interfere with the ability of the network management computer 10 to exchange network management information with the terminals 32 and 34, regardless of any concurrent communications sessions in which the terminals are engaged.

Similarly, because virtual circuit 62 presents a representation of a terminal cluster controller having one terminal coupled thereto, address translation information must be stored to allow communications between the application computer 20 and the terminal, in this case terminal 32.

The virtual circuit 60 is established when the service in the access module 46 is activated. The mechanism used is an automatic direct call. The access module 46 stores the information required to implement an automatic direct call from each terminal cluster controller 30 connected to the access module 46 to each designated network management computer 10. The computer designated as the network management computer 10 must have the terminal cluster controller 30 included in its network configuration table prior to initial activation of the service in the access module 46.

In addition to exchanging network management information, the network management computer 10 may be allowed to control the terminal cluster controller 30 using its own commands and tests. This is done by storing in the access module 46 a data field which indicates, whether or not the network management computer 10 is allowed control over the terminal cluster controller 30.

Although the drawing shows only two computers and one terminal cluster controller coupled to the packet network 40, obviously many more may be so coupled in a practical system.

Numerous modifications, variations, and adaptations may be made to the particular embodiments of the invention described above without departing from the scope of the invention, which is defined in the claims.

What is claimed is:

1. A method of operating a packet switching network comprising at least a first network access module having a plurality of terminals coupled thereto via a terminal cluster controller and at least two second network access modules each having a respective computer coupled thereto, the method comprising the steps of:

storing in the first network access module information relating to a configuration of the terminal cluster controller and said plurality of terminals;

establishing a first switched virtual circuit connection between the first network access module and one of the second network access modules having a first computer coupled thereto, wherein the first network access module provides a representation of said configuration of the terminal cluster controller and said configuration of the terminal cluster controller and said plurality of terminals from the stored information to the first computer via this first switched virtual circuit connection for control of the terminal cluster controller and said plurality of terminals by said first computer;

establishing a second switched virtual circuit connection between the first network access module and one of the second network access modules having a second computer coupled thereto, wherein the first network access module provides a representation of a single one of said plurality of terminals coupled thereto via the terminal cluster controller to the second computer via this second switched virtual circuit connection; and establishing addresses in the first network access module for communications via the second switched virtual circuit connection between the second computer and said single one of said plurality of terminals.

2. A method as claimed in claim 1 and including the step of passing a command from said first computer to said terminal cluster controller via said first switched virtual circuit connection for controlling said terminal cluster controller.

3. A method as claimed in claim 1 and including the step of passing a command from said first computer to one of said plurality of terminals via said first switched virtual circuit connection for controlling said single one of said plurality of terminals.

4. A method as claimed in claim 1 and including the step of exchanging information, relating to monitoring network performance, between said first computer and said terminal cluster controller via said first switched virtual circuit connection for monitoring said terminal cluster controller.

5. A method as claimed in claim 1 and including the step of exchanging information, relating to monitoring network performance, between said first computer and one of said plurality of terminals via said first switched virtual circuit connection for monitoring said single one of said plurality of terminals.

* * * * *

UNITED STATES PATENT AND TRADEMARK OFFICE
CERTIFICATE OF CORRECTION

PATENT NO. : 5,023,780

DATED : June 11, 1991

INVENTOR(S) : John R. BREARLEY

It is certified that error appears in the above-identified patent and that said Letters Patent is hereby corrected as shown below:

Column 5, line 16: Delete "establishing" and insert therefor --translating--.

Signed and Sealed this

Twenty-fourth Day of August, 1993

Attest:

BRUCE LEHMAN

*Attesting Officer*       *Commissioner of Patents and Trademarks*